(12) United States Patent
Martinez et al.

(10) Patent No.: US 9,439,228 B2
(45) Date of Patent: Sep. 6, 2016

(54) METHOD FOR MANAGING AT LEAST ONE DYNAMIC VIRTUAL CONNECTION BETWEEN A MOBILE TERMINAL AND A COMMUNICATION NETWORK, THE ASSOCIATED COMPUTER PROGRAM PRODUCTS AND COMMUNICATION NETWORK

(71) Applicant: THALES, Neuilly Sue Seine (FR)

(72) Inventors: Natael Martinez, Velizy (FR); Christophe Mathieu, Velizy (FR)

(73) Assignee: THALES, Neuilly sur Seine (FR)

( * ) Notice: Subject to any disclaimer, the term of this patent is extended or adjusted under 35 U.S.C. 154(b) by 123 days.

(21) Appl. No.: 14/331,021

(22) Filed: Jul. 14, 2014

(65) Prior Publication Data

US 2015/0016424 A1    Jan. 15, 2015

(30) Foreign Application Priority Data

Jul. 15, 2013  (FR) ..................................... 13 01668

(51) Int. Cl.
*H04W 36/00* (2009.01)
*H04W 76/02* (2009.01)
*H04L 12/46* (2006.01)

(52) U.S. Cl.
CPC ........ *H04W 76/021* (2013.01); *H04L 12/4641* (2013.01); *H04W 36/0044* (2013.01)

(58) Field of Classification Search
CPC ............... H04L 45/02; H04L 12/4641; H04L 63/0272; H04L 65/102; H04W 76/022; H04W 8/005; H04W 36/0072; H04W 36/0083; H04W 36/30
USPC ......................................... 370/331, 338, 401
See application file for complete search history.

(56) References Cited

U.S. PATENT DOCUMENTS 7,164,915 B2 * 1/2007 Zaki ...................... H04W 36/26
455/436
2010/0074109 A1    3/2010 Klingenbrunn et al.
(Continued)

FOREIGN PATENT DOCUMENTS

FR          2 980 938 A1    4/2013

OTHER PUBLICATIONS

Search Report dated May 27, 2014 for French Patent Application No. 1301668 filed on Jul. 15, 2013.

*Primary Examiner* — Dang Ton
*Assistant Examiner* — Sai Aung
(74) *Attorney, Agent, or Firm* — Knobbe, Martens, Olson & Bear, LLP

(57) ABSTRACT

A method relating to the management of at least one dynamic virtual connection between a mobile terminal and a communication network is disclosed. In one aspect, one or more dynamic virtual connections are arranged between the mobile terminal and a gateway, each having at least one connection parameter. The method including detecting the connection of the terminal to another base station, connected to a subsequent gateway to which the terminal was not previously connected. It includes the creation, via a subsequent quality of service manager connected to the subsequent gateway, of dynamic virtual connections between the mobile terminal and the subsequent gateway, the number of dynamic virtual connections created being equal to the number of preceding dynamic virtual connections and the connection parameters of the dynamic virtual connections created being identical to the connection parameters of the preceding dynamic virtual connections.

16 Claims, 3 Drawing Sheets

(56) References Cited

U.S. PATENT DOCUMENTS

| | | | |
|---|---|---|---|
| 2010/0177674 A1* | 7/2010 | Aggarwal | H04L 45/02 370/312 |
| 2010/0278141 A1* | 11/2010 | Choi-Grogan | H04W 36/0083 370/331 |
| 2012/0170547 A1* | 7/2012 | Oprescu-Surcobe | H04W 36/0072 370/331 |
| 2012/0214492 A1 | 8/2012 | Mihaly et al. | |
| 2014/0092885 A1* | 4/2014 | Venkatachalam | H04W 76/023 370/338 |
| 2014/0376559 A1* | 12/2014 | Diwane | H04L 49/35 370/401 |
| 2015/0127733 A1* | 5/2015 | Ding | H04W 4/08 709/204 |

* cited by examiner

METHOD FOR MANAGING AT LEAST ONE DYNAMIC VIRTUAL CONNECTION BETWEEN A MOBILE TERMINAL AND A COMMUNICATION NETWORK, THE ASSOCIATED COMPUTER PROGRAM PRODUCTS AND COMMUNICATION NETWORK

CROSS-REFERENCE TO RELATED APPLICATIONS

This application claims benefit under 35 U.S.C. §119 of French Application No. 13 01668, filed Jul. 15, 2013, which is herein incorporated by reference in its entirety.

BACKGROUND OF THE INVENTION

1. Field of the Invention

The described technology relates to a method for managing at least one dynamic virtual connection between a mobile terminal and a communication network.

2. Description of the Related Art

The communication network is in conformity with the LTE (abbreviated from the English: Long Term Evolution) standard as defined by the standardization body 3GPP (abbreviated from the English: 3rd Generation Partnership Project). The communication network includes a plurality of quality of service managers, also known as PCRF (abbreviated from the English: Policy Charging and Rules Function) according to the LTE standard; multiple network gateways, also known as EPC (abbreviated from the English: Evolved Packet Core) according to the LTE standard; and multiple base stations, also known as eNodeB (derived from the English term: Evolved Node B) according to the LTE standard, each network gateway being connected, on the one hand, to a quality of service manager, and on the other hand, to one or more base stations.

The communication network has a distributed architecture spread across a plurality of radio sites, with each radio site having its own quality of service manager, its own network gateway its own base station or stations.

The mobile terminal, also known as UE (abbreviated from the English: User Equipment) according to the LTE standard, is capable of being connected to a base station and adapted to be connected to a gateway via the base station, the gateway being dependent upon the location of the mobile terminal.

A static virtual connection (derived from the English term static bearer) within the meaning and scope of the LTE standard is arranged by default between the mobile terminal and the gateway, this static virtual connection is then known as a default virtual connection (derived from the English term default bearer) within the meaning and scope of the LTE standard. In addition, one or more static virtual connections are dedicated virtual connections (derived from the English term dedicated bearer) within the meaning and scope of the LTE standard.

One or more dynamic virtual connections (derived from the English term dynamic bearer) according to the LTE standard are also arranged between the mobile terminal and the gateway, via the base station, each dynamic virtual connection having at least one connection setting and parameter. The dynamic virtual connection or connections are dedicated virtual connections within the meaning and scope of the LTE standard.

The method includes the step of detecting the connection of the mobile terminal to another base station, the other base station being connected to a subsequent gateway to which the mobile terminal was not previously connected, the step of detecting being carried out by the subsequent gateway. This step of detection occurs, for example, consecutive to a change of location of the mobile terminal from a zone of coverage associated with the initial gateway, also known as the preceding gateway, to a zone of coverage associated with the subsequent gateway. The passing from a preceding gateway to a subsequent gateway corresponds to a transfer procedure known as hand over (derived from the English term hand over).

Certain disclosed embodiments also relate to a computer program product comprising of software instructions, which when they are executed by a computer, implement certain steps of such a method.

Certain disclosed embodiments also relate to such a communication network that is in conformity with the LTE standard.

The document FR 2 980 938 A1 discloses a handover procedure for handover from a preceding network gateway to a subsequent network gateway in a fourth generation communication network having a distributed architecture. When the mobile terminal connects to a base station affiliated to a controller to which the mobile terminal was not affiliated up to the present moment, the controller transmits to the gateway of the network connected to the base station, the so called subsequent gateway, a message including the IP address of the mobile terminal. The subsequent gateway then distributes to all the other gateways of the communication network, a message containing the IP address of the mobile terminal and its own IP address, in order to notify them of the moving of the mobile terminal.

However, the quality of service, also known as QoS (abbreviation derived from the English term Quality of Service) of such a fourth generation communication network with distributed architecture, although satisfactory, is not optimal.

SUMMARY OF CERTAIN INVENTIVE ASPECTS

The objective of certain embodiments is therefore to propose a method for management of at least one dynamic virtual connection between the mobile terminal and the communication network that provides the means for improving the quality of service of the network.

To this end, the object of certain embodiments relates to a management method of the aforementioned type, wherein the method further includes the step of creating, via a subsequent quality of service manager connected to the subsequent gateway, one or more dynamic virtual connections according to the LTE standard between the mobile terminal and the subsequent gateway, the number of dynamic virtual connections created between the mobile terminal and the subsequent gateway being equal to the number of preceding dynamic virtual connections arranged between the mobile terminal and the preceding gateway, and the connection parameter or parameters of the dynamic virtual connection or connections between the mobile terminal and the subsequent gateway being identical to the connection parameter or parameters of the preceding dynamic virtual connection or connections between the mobile terminal and the preceding gateway.

According to other aspects, the management method includes one or more of the following characteristic features, taken individually or in accordance with any technically possible combination:

the communication network further comprises a plurality of servers, such as Voice over Internet Protocol servers, each being connected to a corresponding quality of service manager and being connected to a corresponding gateway via the quality of service manager, and during the step of creating the dynamic virtual connection or connections between the mobile terminal and the subsequent gateway, the connection parameter or parameters of the preceding dynamic virtual connection or connections are transmitted to a subsequent server connected to the subsequent gateway from a preceding server connected to the preceding gateway;

the subsequent server sends to the preceding server a transmission request requesting transmission of connection parameters in order to receive the connection parameter or parameters of the preceding dynamic virtual connection or connections from the preceding server;

during the step of creating connections, the subsequent server sends, to the subsequent quality of service manager, for each dynamic virtual connection to be created, a command message ordering the creation of the corresponding dynamic virtual connection between the mobile terminal and the subsequent gateway, each command message containing the connection parameter or parameters associated with the dynamic virtual connection;

the communication network further includes a switching member capable of communicating with each corresponding quality of service manager and adapted to route a quality of service related request to a corresponding quality of service manager, and during the step of creating the dynamic virtual connection or connections between the mobile terminal and the subsequent gateway, the connection parameter or parameters of the dynamic virtual connections are transmitted to the subsequent quality of service manager by the switching member;

during the step of creating, the switching member sends, to the subsequent quality of service manager, for each dynamic virtual connection to be created, a command message ordering the creation of the corresponding dynamic virtual connection between the mobile terminal and the subsequent gateway, each command message containing the connection parameter or parameters associated with the dynamic virtual connection;

the communication network is in conformity with version 8 and with the subsequent versions of the LTE standard, as defined by the standardization body 3GPP; and the connection parameter or parameters are selected from the group of: an identifier of a connection class, a priority level, a guaranteed throughput and a maximum throughput; there being assigned to each connection class, a priority, a maximum latency and a maximum packet loss rate.

The object of certain embodiments also relates to a computer program product comprising software instructions, which when executed by a computer, implement one or more of the following steps incumbent upon the subsequent server:

the subsequent server sends to the preceding server a transmission request requesting transmission of connection parameters in order to receive the connection parameter or parameters of the preceding dynamic virtual connection or connections from the preceding server; and during the step of creation, the subsequent server sends, to the subsequent quality of service manager, for each dynamic virtual connection to be created, a command message ordering the creation of the corresponding dynamic virtual connection between the mobile terminal and the subsequent gateway, each command message containing the connection parameter or parameters associated with the dynamic virtual connection.

The object of certain embodiments also relates to a computer program product comprising software instructions, which when they are executed by a computer, implement one or more of the following steps that are incumbent upon the switching member:

during the step of creating the dynamic virtual connection or connections between the mobile terminal and the subsequent gateway, the connection parameter or parameters of the dynamic virtual connection or connections are transmitted to the subsequent quality of service manager by the switching member; and during the step of creating, the switching member sends, to the subsequent quality of service manager, for each dynamic virtual connection to be created, a command message ordering the creation of the corresponding dynamic virtual connection between the mobile terminal and the subsequent gateway, each command message containing the connection parameter or parameters associated with the dynamic virtual connection.

The object of certain embodiments also relates to a communication network for communicating with at least one mobile terminal, the network being in conformity with the LTE standard and comprising a plurality of quality of service managers, multiple network gateways and a plurality of base stations, each network gateway being connected, on the one hand, to a quality of service manager, and on the other hand, to one or more base stations, the mobile terminal being capable of being connected to a base station and of being connected to a gateway via the base station, the gateway being dependent upon the location of the mobile terminal, one or more dynamic virtual connections in accordance with the LTE standard being adapted to be arranged between the mobile terminal and the gateway, via the base station, each having at least one connection parameter, the network further including the detection means for detecting the connection of the mobile terminal to another base station, the other base station being connected to a subsequent gateway to which the mobile terminal was not previously connected, the detection means being included in the subsequent gateway, wherein the network in addition includes the creation means for creating, via a subsequent quality of service manager connected to the subsequent gateway, one or more dynamic virtual connections according to the LTE standard between the mobile terminal and the subsequent gateway, the number of dynamic virtual connections created between the mobile terminal and the subsequent gateway being equal to the number of preceding dynamic virtual connections arranged between the mobile terminal and the preceding gateway, and the connection parameter or parameters of the dynamic virtual connection or connections between the mobile terminal and the subsequent gateway being identical to the connection parameter or parameters of the preceding dynamic virtual connection or connections between the mobile terminal and the preceding gateway.

According to other aspects, the communication network includes one or more of the following characteristic features, taken individually or in accordance with any technically possible combination:

the communication network further comprises a plurality of servers, such as Voice over IP servers, each being connected to a corresponding quality of service manager and being connected to a corresponding gateway via the quality of service manager, and a preceding server connected to the preceding gateway includes the transmission means for transmitting, during the creation of the dynamic virtual connection or connections between the mobile terminal and the subsequent gateway, the connection parameter or parameters of the preceding dynamic virtual connection or connections to a subsequent server connected to the subsequent gateway;

the subsequent server comprises the message dispatch means for sending, to the subsequent quality of service manager, for each dynamic virtual connection to be created, a command message ordering the creation of the corresponding dynamic virtual connection between the mobile terminal and the subsequent gateway, each command message containing the connection parameter or parameters associated with the dynamic virtual connection;

the communication network further includes a switching member capable of communicating with each corresponding quality of service manager and adapted to route a quality of service related request to a corresponding quality of service manager, and the switching member includes the transmission means for transmitting, during the creation of the dynamic virtual connection or connections between the mobile terminal and the subsequent gateway, the connection parameter or parameters of the preceding dynamic virtual connection or connections to the subsequent quality of service manager; and the switching member comprises the message dispatch means for sending, to the subsequent quality of service manager, for each dynamic virtual connection to be created, a command message ordering the creation of the corresponding dynamic virtual connection between the mobile terminal and the subsequent gateway, each command message containing the connection parameter or parameters associated with the dynamic virtual connection.

BRIEF DESCRIPTION OF THE DRAWINGS

These characteristic features and advantages of certain illustrative embodiments shall become apparent upon reviewing the description that follows, provided purely by way of non limiting example, and with reference being made to the accompanying drawings in which.

DETAILED DESCRIPTION OF CERTAIN ILLUSTRATIVE EMBODIMENTS

Figure 1:
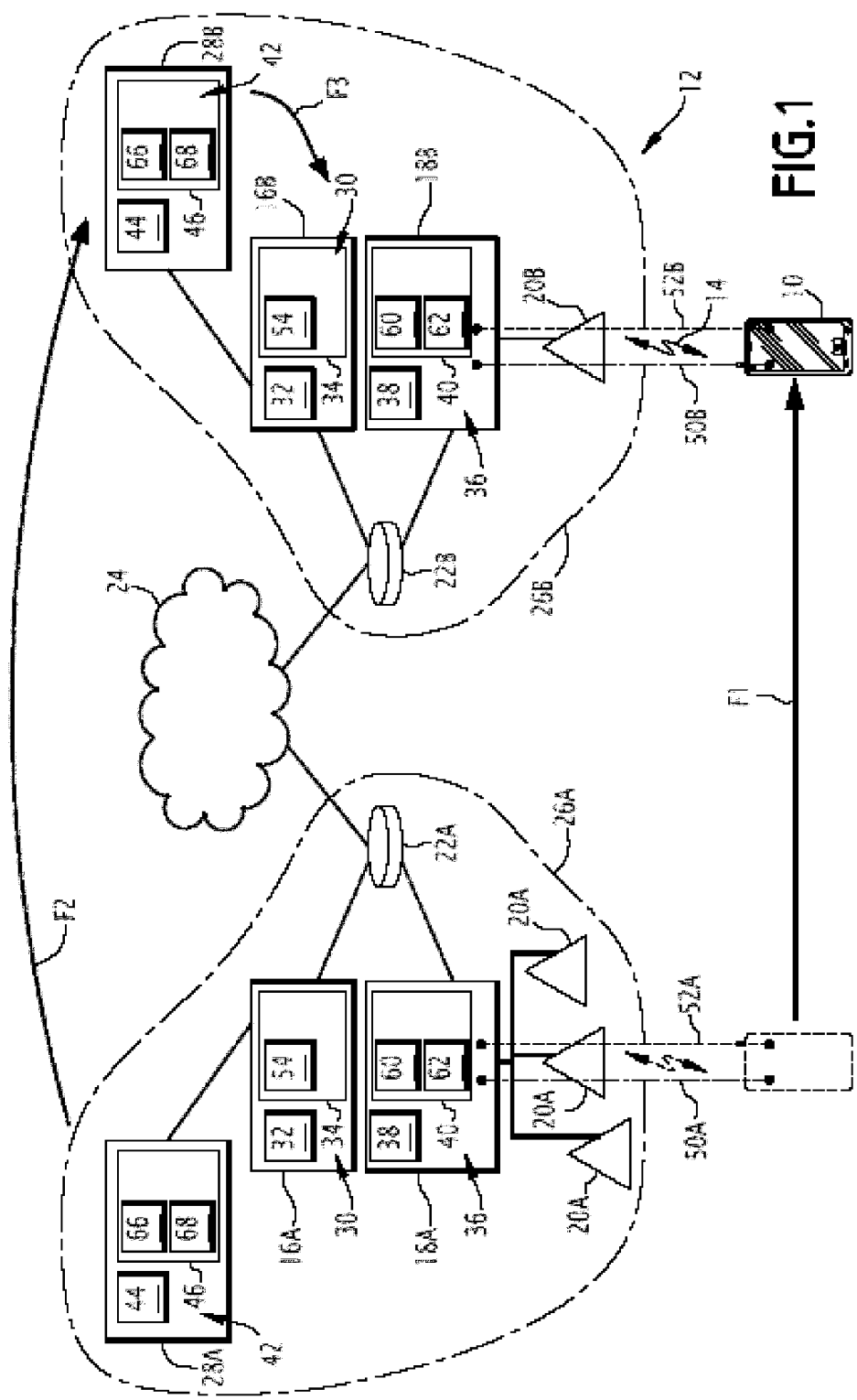
FIG. 1 is a schematic representation of a communication network according to a first embodiment.

In FIG. 1, a mobile terminal 10 is connected to a communication network 12 via a radio link 14. The mobile terminal 10, the communication network 12 and the radio link 14 are in conformity with the LTE standard as defined by the standardization body 3GPP, for example, conforming to version 8 (or in English: release 8) and to subsequent versions of the LTE standard. In other words, the mobile terminal 10, the communication network 12 and the radio link 14 are, for example, in conformity with the particular releases 8, 9 and 10 of the LTE standard.

The mobile terminal 10 is known per se, and is, for example, a mobile phone, a portable computer or any other portable/handheld electronic device that conforms to the LTE standard.

The communication network 12 includes a plurality of quality of service managers 16A, 16B, also known as PCRF (abbreviated from the English: Policy Charging and Rules Function) according to the LTE standard; multiple network gateways 18A, 18B, also known as EPC (abbreviated from the English: Evolved Packet Core) according to the LTE standard; and multiple base stations 20A, 20B, also known as eNodeB (derived from the English term: Evolved Node B) according to the LTE standard, each network gateway 18A, 18B being connected, on the one hand, to a quality of service manager 16A, 16B, and on the other hand, to one or more base stations 20A, 20B.

The communication network 12 further comprises communication routers 22A, 22B, each quality of service manager 16A, 16B and each network gateway 18A, 18B being connected to a corresponding communication router 22A, 22B.

In addition, the communication network 12 is connected to an interconnection network 24 by means of the corresponding communication routers 22A, 22B, the interconnection network 24 being adapted to be connected to the Internet, not shown.

The communication network 12 has a distributed architecture spread across a plurality of radio sites 26A, 26B, with each radio site 26A, 26B having its own quality of service manager 16A, 16B, its own network gateway 18A, 18B and its own base station or stations 20A, 20B. In the example shown in FIG. 1, the communication network 12 comprises a first radio site 26A and a second radio site 26B, the first radio site 26A having three base stations 20A and the second radio site 26B with a single base station 20B.

In the embodiment example shown in FIG. 1, the communication network 12 further includes a plurality of servers 28A, 28B. Each server 28A, 28B is connected to a corresponding quality of service manager 16A, 16B, and is connected to a corresponding gateway 18A, 18B via the quality of service manager 16. Each radio site 26A, 26B then further comprises at least one corresponding server 28A, 28B.

The mobile terminal 10 is adapted to be connected to a corresponding base station 20A, 20B depending upon its location, that is to say, based on its geographic location, and to be connected to the corresponding gateway 18A, 18B via the base station 20, the gateway 18A, 18B is also dependent upon the location of the mobile terminal 10. A zone of coverage is associated with each gateway 18, or in other words, with each radio site 26. In the example shown in FIG. 1, the mobile terminal 10 was initially located in the zone of coverage of the gateway 18A and was connected to the radio site 26A, as shown with the terminal 10 represented in dashed lines, more specifically to one of the base stations 18A connected to the gateway 20A. The terminal 10 is then moved along the arrow F1 in the zone of coverage of the gateway 18B and is then connected to the radio site 26B, more specifically to the base station 20B connected to the gateway 18B, as shown with the terminal 10 represented in continuous line.

The passing from the initial gateway 18A to a new gateway 18B corresponds to a transfer procedure known as hand over (from the English term hand over).

In the following sections of the description, the initial gateway 18A is also called the preceding gateway, given that it was connected to the mobile terminal 10 prior to the handover procedure, and the new gateway 18B is also called subsequent gateway given that it is connected to the mobile terminal 10 following completion of the handover procedure associated with the terminal 10.

In a similar manner, the various different elements of the radio site 26A, also known as the preceding radio site associated with the preceding gateway 18A are respectively known as preceding quality of service manager 16A, preceding base station 20A for the base station to which the mobile terminal 10 was connected, preceding communication router 20A and preceding server 28A.

In a similar manner, the various different elements of the radio site 26B, also known as the subsequent radio site associated with the subsequent gateway 18B are respectively known as subsequent quality of service manager 16B, subsequent base station 20B for the base station to which the mobile terminal 10 is connected following completion of the handover procedure, subsequent communication router 20B and subsequent server 28B.

Each quality of service manager 16A, 16B includes a first information processing unit 30 formed, for example by a first processor 32 and a first memory 34 associated with the first processor.

Each network gateway 18A, 18B forms a communication interface between the radio site 26A, 26B on which it depends and the interconnection network 24, the latter itself being adapted to be connected to the Internet. Each network gateway 18A, 18B comprises a second information processing unit 36 formed for example by a second processor 38 and a second memory 40 associated with the second processor.

In the embodiment example described, the quality of service manager 16A, 16B and the network gateway 18A, 18B are separate electronic equipment units and each include their own information processing unit 30, 36. By way of a variant, the quality of service manager 16A, 16B and the network gateway 18A, 18B are arranged in the same electronic equipment unit that has common information processing unit shared by the quality of service manager 16A, 16B and the network gateway 18A, 18B.

Each communication router 22A, 22B is known per se.

Each server 28A, 28B is, for example, a Voice over IP server, also known as VoIP server (derived from the English term Voice over Internet Protocol). Each server 28A, 28B comprises a third information processing unit 42, for example formed by a third processor 44 and a third memory associated with the third processor 46.

One or more static virtual connections 50A, 50B (derived from the English term static bearer) according to the LTE standard are adapted to be arranged between the mobile terminal 10 and the gateway 18A, 18B via the base station 20A, 20B, each having at least one connection parameter. One or more dynamic virtual connections 52A, 52B (derived from the English term dynamic bearer) according to the LTE standard are adapted to be arranged between the mobile terminal 10 and the gateway 18A, 18B via the base station 20A, 20B, each having the least one connection parameter. In FIG. 1, the static virtual connections 50A, 50B are shown in the form of broken lines and the dynamic virtual connections 52A, 52B are shown in the form of fine dashed lines.

In the following sections of the description, all of the static and dynamic virtual connections 50A, 52A which existed, prior to the hand over procedure between the preceding gateway 18A and the mobile terminal 10, shall be called respectively preceding static virtual connections 50A and preceding dynamic virtual connections 52A.

For each virtual connection 50A, 50B, 52A, 52B, the connection parameter or parameters are selected from the group of: an identifier of a connection class, a priority level, a guaranteed throughput and a maximum throughput; there being assigned to each connection class, a priority, a maximum latency and a maximum packet loss rate. The connection class identifier is also known as QCI (derived from the English term QoS Class Identifier) within the meaning and scope of the LTE standard, and is an index in a predefined list of classes. The priority level is also known as ARP (derived from the English term Allocation and Retention Policy), and is used for decisions concerning pre-emption between the virtual connections. The guaranteed throughput is also known GBR (derived from the English term Guaranteed Bit Rate) within the meaning and scope of the LTE standard, and defines a value for guaranteed throughput rate in the event of the virtual connection 50A, 50B, 52A, 52B being of the GBR type. Finally, the maximum throughput is also called MBR (derived from the English term Maximum Bit Rate), and defines the maximum throughput permissible for the corresponding virtual connection 50A, 50B, 52A, 52B.

The first memory 34 of each quality of service manager is adapted to store a requisition software application 54, to the corresponding gateway 18A, 18B, in the creation of dynamic virtual connections 52A, 52B between the gateway and the terminal. The request/query originating from the requisition software application 54 is, for example, transmitted via a Gx interface within the meaning and scope of the LTE standard between the corresponding quality of service manager 16A, 16B and the corresponding gateway 18A, 18B.

The second memory 40 of each network gateway is adapted to store detection software 60 for detecting the connection of the mobile terminal 10 to another base station 20B, the other base station 20B, being connected to the gateway which corresponds to the subsequent gateway 18B to which the mobile terminal 10 was not previously connected.

The second memory 40 is also capable of storing a software 62 for generating virtual connections, in particular dynamic virtual connections 52A, 52B, between the corresponding gateway 18A, 18B and the mobile terminal 10, this generation being performed upon request from the quality of service manager 16A, 16B to which is connected the corresponding gateway 18A, 18B.

The third memory 46 of each server is capable of storing a transmission software 66 for transmission of the connection settings and parameter or parameters of the preceding dynamic virtual connection or connections 52A to another server, corresponding to the subsequent server 28B connected to the subsequent gateway 18B as part of the hand over procedure.

The third memory 46 of each server is also capable of storing a message dispatch software 68 for sending, to a quality of service manager other than the one to which the server is connected and corresponding to the subsequent quality of service manager 16B, as part of the hand over procedure, for each dynamic virtual connection 52B to be created, a command message ordering the creation of the corresponding dynamic virtual connection 52B between the mobile terminal 10 and the subsequent gateway 18B. Each command message contains the connection parameter or parameters associated with the dynamic virtual connection 52B. Each command message is, for example, transmitted via an Rx interface within the meaning and scope of the LTE standard between the corresponding server 28A, 28B and the corresponding quality of service manager 16A, 16B.

In the embodiment described, the transmission software 66, the message dispatch software 68 as well as the requisition software 54 and the virtual connection generating software 62 form the creation means for creating, via the subsequent quality of service manager 16B connected to the subsequent gateway 18B, one or more dynamic virtual connections 52B according to the LTE standard, between the mobile terminal 10 and the subsequent gateway 18B. The number of dynamic virtual connections 52B created between the mobile terminal 10 and the subsequent gateway 18B is equal to the number of preceding dynamic virtual connections 52A arranged between the mobile terminal 10 and the preceding gateway 18A, and the connection parameter or parameters of the dynamic virtual connection or connections 52B between the mobile terminal 10 and the subsequent gateway 18B are identical to the connection parameter or parameters of the preceding dynamic virtual connection or connections 52A between the mobile terminal 10 and the preceding gateway 18A.

By way of a variant, the requisition means 54, the detection means 60, the virtual connection generating means 62, the transmission means 66 and the message dispatch means 68 are developed in the form of dedicated electronic circuits or even in the form of programmable logic components.

Figure 2:
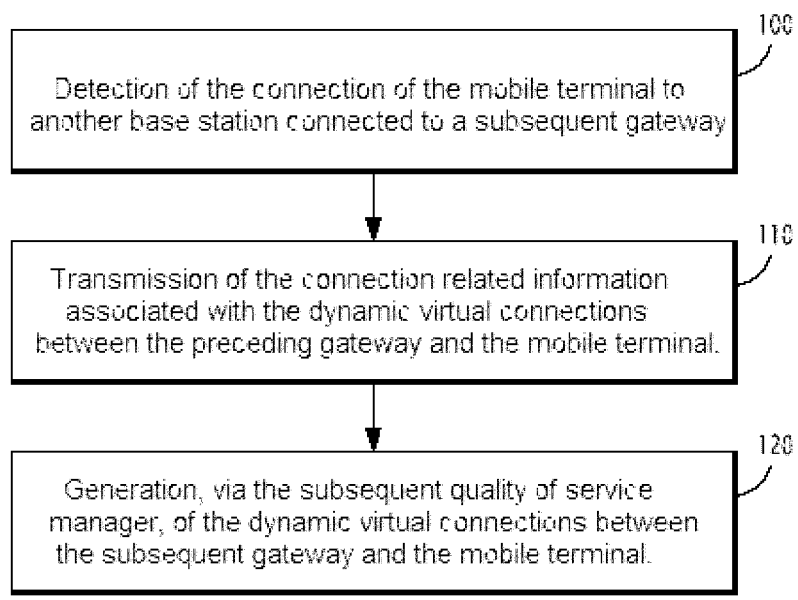
FIG. 2 is a flowchart of a management method for managing dynamic virtual connections between a mobile terminal and the communication network.

The operation of the communication network 12 according to various embodiments will now be described with the aid of FIGS. 1 and 2, FIG. 2 representing a flowchart of the method for managing dynamic virtual connections 52A, 52B according to various embodiments.

This operation is described in the context of the procedure for hand over from the preceding gateway 18A to the subsequent gateway 18B following the moving of the terminal 10 along the direction of the arrow F1 from the zone of coverage associated with the preceding radio site 26A up to the zone of coverage associated with the subsequent radio site 26B.

In the example in FIG. 1, a preceding static virtual connection 50A, that is to say a default virtual connection (derived from the English term default bearer), and a preceding dynamic virtual connection 52A were arranged between the mobile terminal 10 and the preceding gateway 18A prior to the hand over procedure.

The preceding dynamic virtual connection or connections 52A arranged between the mobile terminal 10 and the preceding gateway 18A were created at the request of the preceding server 26A, and the latter then has available all the connection related information, in particular the connection parameters QCI, ARP, GBR and MBR, relating to these preceding dynamic virtual connections 52A.

Following the moving of the terminal 10 in the zone of coverage associated with the subsequent gateway 18B, the subsequent gateway 18B detects, during the step 100 and by making use of the detection software 60, the connection of the mobile terminal 10 to the base station 20B which is connected thereto. The subsequent gateway 18B then informs the subsequent quality of service manager 16B and the subsequent server 28B of the arrival of the mobile terminal 10 in the zone of coverage associated with the radio site 26B on which they depend and of the connection of the mobile terminal 10 to the base station 20B.

Following this detection and in accordance with the hand over procedure provided for by the LTE standard, a static virtual connection 50B, that is, a default virtual connection, is automatically recreated between the mobile terminal 10 and the subsequent gateway 18B, by making use of the virtual connection generating software 62 and upon request from the requisition software 54 of the subsequent quality of service manager 16B.

In the event where, in addition, dedicated static virtual connections had been created between the mobile terminal 10 and the preceding gateway 18A, these are recreated automatically between the mobile terminal 10 and the subsequent gateway 18B.

After having received the information from the subsequent gateway 18B according to which the mobile terminal 10 has moved from the zone of coverage associated with the preceding radio site 26A to the zone of coverage associated with the subsequent radio site 26B, the subsequent server 28B uses an inter-server communication interface, not shown, in order to find the preceding server 26A, and requests from the preceding server 28A the connection related information associated with the preceding dynamic virtual connections 52A arranged between the mobile terminal 10 and the preceding gateway 18A prior to the hand over procedure.

The preceding server 28A then transmits to the subsequent server 28B (arrow F2), during the step 110 by making use of the transmission software 66, the connection related information, in particular the connection parameters, such as the connection (QoS) class identifiers QCI, the priority levels ARP, the guaranteed bit rates GBR and the maximum bit rates MBR, for each of the preceding dynamic virtual connections 52A arranged between the mobile terminal 10 and the preceding gateway 18A prior to the hand over procedure. This transmission is carried out via the communication routers 22A, 22B and the interconnection network 24. In other words, the subsequent server 28B has recovered, upon conclusion of the step 110 and from the preceding server 28A, the context of the preceding dynamic virtual connections 52A arranged between the mobile terminal 10 and the preceding gateway 18A prior to the hand over procedure.

In addition, the connection related information includes one or more filtering rules associated with each of the virtual connections. The filtering rules include entry criteria for the traffic flowing over these virtual connections. They are, for example, based on information such as numbers of ports used, source IPs or destination IPs, DSCP tags (derived from the English term Differentiated Services Code Point) with tag information provided over the IP packets.

After having received the connection related information from the preceding server 26A, the subsequent server 26B sends, during the step 120 and by making use of its message dispatch software 68, to the subsequent quality of service manager 16B (arrow F3), for each dynamic virtual connection 52B to be created, the command message ordering the creation of the corresponding dynamic virtual connection 52B between the mobile terminal 10 and the subsequent gateway 18B. This message dispatch is executed for example by using the Rx interface according to the LTE standard. The command message or messages contain the connection related information received from the preceding server 26A in order to ensure that the number of dynamic virtual connections 52B that will be created between the mobile terminal 10 and the subsequent gateway 18B is equal to the number of preceding dynamic virtual connections 52A previously arranged between the mobile terminal 10 and the preceding gateway 18A, and that the connection parameters of the dynamic virtual connections 52B between the mobile terminal and the subsequent gateway 18B are identical to the connection parameters of the preceding dynamic virtual connections 52A between the mobile terminal and preceding gateway 18A.

When the subsequent quality of service manager 16B has received, for each dynamic virtual connection 52B to be created, the command message from the subsequent server 26B, it requests of the subsequent gateway 18B, during the step 120 and by making use of its requisition software 54, the creation of the dynamic virtual connections 52B between the subsequent gateway 18B and the mobile terminal 10. This request between the subsequent quality of service manager 16B and the subsequent gateway 18B is for example transmitted using the Gx interface according to the LTE standard. The subsequent gateway 18B then generates, by making use of its connection generating software 62 and based on the connection related information contained in each command message, the dynamic virtual connections 52B between itself and the mobile terminal 10.

The management method and the communication network 12 according to various embodiments thus makes it possible, following the hand over procedure for transferring the mobile terminal 10 from the preceding gateway 18A to the subsequent gateway 18B, to automatically recreate between the subsequent gateway 18B and the mobile terminal 10 the dynamic virtual connections that existed, prior to the hand over procedure, between the preceding gateway 18A and the mobile terminal 10. This provides the ability to improve the quality of service of the communication network 12 according to various embodiments as compared to the communication network according to the state of the art that does not support the transfer (hand over) of dynamic virtual connections in a distributed architecture.

Thus, following the procedure of hand over from the preceding gateway 18A to the subsequent gateway 18B, all of the static and dynamic virtual connections 50A, 52A that previously existed prior to this hand over procedure, between the preceding gateway 18A and the mobile terminal 10, are automatically recreated between the subsequent gateway 18B and the mobile terminal 10, which ensures the ability to improve the quality of service of the communication network 12 according to various embodiments. The term "recreation of virtual connections" is understood to refer to the creation of new virtual connections between the subsequent gateway and the terminal on an identical basis, that is to say, with the same connection parameters, as those that existed between the preceding gateway and the terminal.

Figure 3:
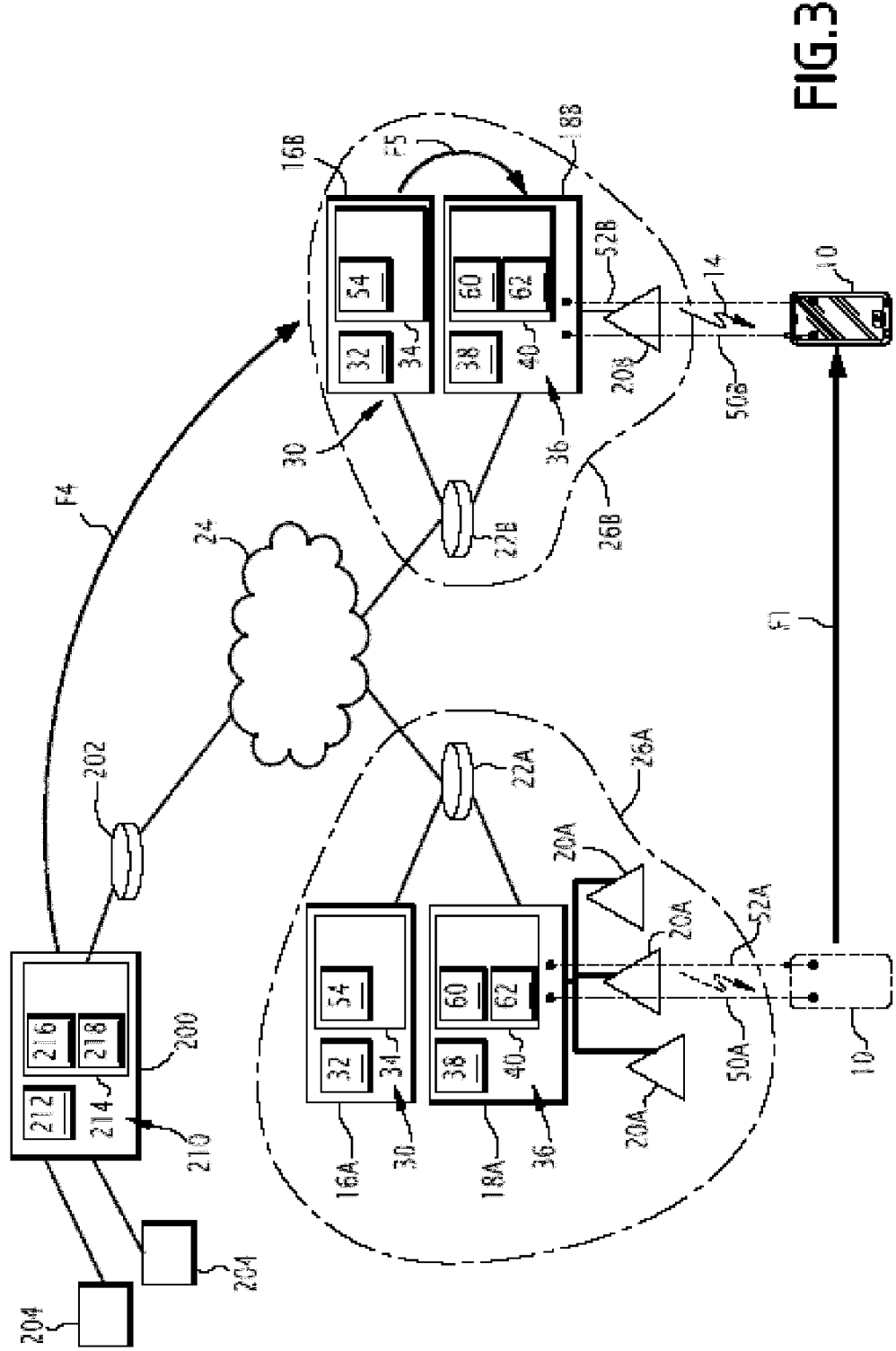
FIG. 3 presents a view similar to that in FIG. 1 according to a second embodiment.

FIG. 3 illustrates a second embodiment for which the elements that are identical to those in the first embodiment, previously described above with reference to FIGS. 1 and 2, are identified by the identical reference numerals and are thus not described again.

According to this second embodiment, the communication network 12 further includes a switching member 200, also known as DRA (derived from the English term Diameter Routing Agent) within the meaning and scope of the LTE standard, capable of communicating with each corresponding quality of service manager 16A, 16B via a communication router 202, the interconnection network 24 and the corresponding communication router 22A, 22B. The switching member 200 is adapted to route a quality of service related request/query to a corresponding quality of service manager 16A, 16B.

According to this second embodiment, the communication network 12 further comprises one or more servers 204, servers such as Voice over IP servers, also known as VoIP servers, connected to the switching member 200.

In the example shown in FIG. 3, the communication network 12 does not include a server connected, for each radio site, to the corresponding quality of service manager.

By way of a variant, the communication network 12 also includes servers, not shown, which are connected, for each radio site, to the corresponding quality of service manager. In other words, according to this variant, each radio site also includes a server connected to the corresponding quality of service manager. The person skilled in the art will then understand that the first embodiment and the second embodiment are thus not exclusionary of one another.

In the example shown in FIG. 3, the switching member 200 is centralized for all of the radio sites 26A, 26B, and is also known as centralized switching member, or even PCRF DRA (abbreviated from the English Policy Charging and Rules Function—Diameter Routing Agent) within the meaning and scope of the LTE standard.

By way of a variant not shown, the communication network 12 includes a plurality of switching members 200 switch each being capable of managing separate individual virtual connections.

The switching member 200 comprises a fourth information processing unit 210 formed for example by a fourth processor 212 and a fourth memory 214 associated with the fourth processor.

The fourth memory 214 of the switching member is capable of storing a transmission software 216 for transmission of the connection settings and parameter or parameters of the preceding dynamic virtual connection or connections 52A to another quality of service manager corresponding to the subsequent quality of service manager 16B connected to the subsequent gateway 18B as part of the hand over procedure.

The fourth memory 214 is also capable of storing a message dispatch software 218 for sending, to the subsequent quality of service manager 16B, 52B for each dynamic virtual connection 52B to be created, a command message ordering the creation of the corresponding dynamic virtual connection 52B between the mobile terminal 10 and the subsequent gateway 18B, each command message containing the connection parameter or parameters associated with the dynamic virtual connection 52B.

According to this second embodiment, the transmission software 216, the message dispatch software 218, as well as the requisition software 54 and the virtual connection generating software 62 form the creation means for creating, via the subsequent quality of service manager 16B connected to the subsequent gateway 18B, one or more dynamic virtual connections 52B according to the LTE standard, between the mobile terminal 10 and the subsequent gateway 18B.

The operation of the communication network 12 according to this second embodiment will now be described with the aid of FIGS. 2 and 3.

In a manner analogous to the first embodiment previously described above, this operation will be described in the context of the procedure for hand over from the preceding gateway 18A to the subsequent gateway 18B following the moving of the terminal 10 along the direction of the arrow F1 from the zone of coverage associated with the preceding radio site 26A up to the zone of coverage associated with the subsequent radio site 26B.

In the example shown in FIG. 3, the preceding static and dynamic virtual connections 50A 52A were arranged between the mobile terminal 10 and the preceding gateway 18A prior to the hand over procedure.

The preceding dynamic virtual connection or connections 52A arranged between the mobile terminal 10 and the preceding gateway 18A had been created upon the request from a corresponding server 204 sent to the switching member 200. When the switching member 200 received this request for creating dynamic virtual connections from a corresponding server 204, it forwarded the same to the corresponding quality of service manager 16A, while in passing recording in its memory 214 all of the connection related information, in particular the connection parameters QCI, ARP, GBR and MBR, relating to the preceding dynamic virtual connections 52A.

In a manner analogous to the first embodiment previously described above, following the moving of the terminal 10 along the direction of the arrow F1, the subsequent gateway 18B detects, during the step 100, the connection of the mobile terminal 10 to the base station 20B which is connected thereto. The subsequent gateway 18B then informs the subsequent quality of service manager 16B and the switching member 200 of the arrival of the mobile terminal 10 in the zone of coverage associated with the subsequent radio site 26B and of the connection of the mobile terminal 10 to the base station 20B.

After having received the information from the subsequent gateway 18B according to which the mobile terminal 10 has moved from the zone of coverage associated with the preceding radio site 26A to the zone of coverage associated with the subsequent radio site 26B, the switching member 200 transmits to the subsequent quality of service manager 16B (arrow F4) during the step 110 and by making use of its transmission software 216, the connection related information for each of the preceding dynamic virtual connections 52A arranged between the mobile terminal 10 and the preceding gateway 18A prior to the hand over procedure.

Such connection related information includes in particular the connection parameters, such as connection (QoS) class identifiers QCI, the priority levels ARP, the guaranteed bit rates GBR and the maximum bit rates MBR. This transmission is carried out via the communication routers 202, 22B and the interconnection network 24, for example by using the Rx interface in accordance with the LTE standard.

In addition, the connection related information includes one or more filtering rules associated with each of the virtual connections. The filtering rules include entry criteria for the traffic flowing over these virtual connections, and are, for example, based on information such as numbers of ports used, source IPs or destination IPs, DSCP tags with tag information provided over the IP packets.

The switching member 200 sends, during the step 120 and by making use of its message dispatch software 218, to the subsequent quality of service manager 16B, for each dynamic virtual connection 52B to be created, a command message ordering the creation of the corresponding dynamic virtual connection 52B between the mobile terminal 10 and the subsequent gateway 18B. This message dispatch is executed for example by using the Rx interface according to the LTE standard. The command message or messages contain the connection related information related to the dynamic virtual connections 52B to be created, in order to ensure that the number of dynamic virtual connections 52B that will be created between the mobile terminal 10 and the subsequent gateway 18B is equal to the number of preceding dynamic virtual connections 52A previously arranged between the mobile terminal 10 and the preceding gateway 18A, and that the connection parameters of the dynamic virtual connections 52B between the mobile terminal and the subsequent gateway 18B are identical to the connection parameters of the preceding dynamic virtual connections 52A between the mobile terminal and preceding gateway 18A.

By way of a variant, the switching member 200 transmits, to the subsequent quality of service manager 16B, at the same time (arrow F4) the connection related information for each of the preceding dynamic virtual connections 52A and, for each dynamic virtual connection 52B to be created, the command message ordering the creation of the corresponding dynamic virtual connection 52B, the respective connection related information being contained in the corresponding command message. In other words, according to this embodiment, the steps 110 and 120 form one same single step.

When the subsequent quality of service manager 16B has received, for each dynamic virtual connection 52B to be created, the command message from the switching member 200, it requests of the subsequent gateway 18B (arrow F5), during the step 120 and by making use of its requisition software 54, the creation of the dynamic virtual connections 52B between the subsequent gateway 18B and the mobile terminal 10. This request between the subsequent quality of service manager 16B and the subsequent gateway 18B is for example transmitted using the Gx interface according to the LTE standard. The subsequent gateway 18B then generates, by making use of its connection generating software 62 and based on the connection related information contained in each command message, the dynamic virtual connections 52B between itself and the mobile terminal 10.

The management method and the communication network 12 according to this second embodiment thus makes it possible, following the hand over procedure for transferring the mobile terminal 10 from the preceding gateway 18A to the subsequent gateway 18B, to automatically recreate between the subsequent gateway 18B and the mobile terminal 10 the dynamic virtual connections that existed between the preceding gateway 18A and the mobile terminal 10 prior to the hand over procedure. This provides the ability to also improve the quality of service of the communication network 12 according to this second embodiment.

Thus, following the procedure of hand over from the preceding gateway 18A to the subsequent gateway 18B, all of the static and dynamic virtual connections 50A, 52A which previously existed prior to this hand over procedure, between the preceding gateway 18A and the mobile terminal 10, are automatically recreated between the subsequent gateway 18B and the mobile terminal 10, which ensures the ability to improve the quality of service of the communication network 12 according to this second embodiment.

The person skilled in the art will quite obviously understand that each radio site 26A, 26B is likely to be successively a preceding radio site or a subsequent radio site according to whether the mobile terminal 10 is exiting from or entering into the zone of coverage associated with this radio site. In addition, given that each quality of service manager 16A, 16B, each network gateway 18A, 18B, and also according to the first embodiment, that each server 28A, 28B, respectively includes the requisition software 54, the detection software 60, the virtual connection generating software 62 the transmission software 66 and the message dispatch software 68, all of the preceding static and dynamic virtual connections 50A, 52A that existed, prior to the hand over procedure, between the preceding gateway and the mobile terminal, are indeed automatically recreated between the subsequent gateway and the mobile terminal, whether the concerned radio site is a preceding radio site or a subsequent radio site.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method of managing at least one dynamic virtual connection between a mobile terminal and a communication network, the communication network being in conformity with the Long Term Evolution (LTE) standard and including a plurality of quality of service managers, multiple network gateways and multiple base stations, each network gateway being connected, on the one hand, to a quality of service manager, and on the other hand, to one or more base stations,
the mobile terminal being configured to be connected to a preceding base station and of being configured to be connected to a preceding gateway via the preceding base station, the preceding gateway being dependent upon the location of the mobile terminal,
one or more dynamic virtual connections in accordance with the LTE standard being arranged between the mobile terminal and the preceding gateway, via the preceding base station, each having at least one connection parameter,
the method includes:
detecting the connection of the mobile terminal to another base station, the other base station being connected to a subsequent gateway to which the mobile terminal was not previously connected, the detecting being carried out by the subsequent gateway,
wherein the method further includes:
creating via a subsequent quality of service manager connected to the subsequent gateway, one or more dynamic virtual connections according to the LTE standard between the mobile terminal and the subsequent gateway, the number of dynamic virtual connections created between the mobile terminal and the subsequent gateway being equal to the number of preceding dynamic virtual connections arranged between the mobile terminal and the preceding gateway, and the connection parameter or parameters of the dynamic virtual connection or connections between the mobile terminal and the subsequent gateway being identical to the connection parameter or parameters of the preceding dynamic virtual connection or connections between the mobile terminal and the preceding gateway.

2. The method according to claim 1, in which the communication network further comprises a plurality of servers, each being connected to a corresponding quality of service manager and being connected to a corresponding gateway via the quality of service manager, and
wherein, during the creating the dynamic virtual connection or connections between the mobile terminal and the subsequent gateway, the connection parameter or parameters of the preceding dynamic virtual connection or connections are transmitted to a subsequent server connected to the subsequent gateway from a preceding server connected to the preceding gateway.

3. The method according to claim 2, in which the subsequent server sends to the preceding server a transmission request requesting transmission of connection parameters in order to receive the connection parameter or parameters of the preceding dynamic virtual connection or connections from the preceding server.

4. The method according to claim 2, in which, during the creating connections, the subsequent server sends to the subsequent quality of service manager, for each dynamic virtual connection to be created, a command message ordering the creation of the corresponding dynamic virtual connection between the mobile terminal and the subsequent gateway, each command message containing the connection parameter or parameters associated with the dynamic virtual connection.

5. The method according to claim 1, in which the communication network further includes a switching member being configured to communicate with each corresponding quality of service manager and being configured to route a quality of service related request to a corresponding quality of service manager, and
in which, during the creating the dynamic virtual connection or connections between the mobile terminal and the subsequent gateway, the connection parameter or parameters of the dynamic virtual connections are transmitted to the subsequent quality of service manager by the switching member.

6. The method according to claim 5, in which, during the creating, the switching member sends, to the subsequent quality of service manager, for each dynamic virtual connection to be created, a command message ordering the creation of the corresponding dynamic virtual connection between the mobile terminal and the subsequent gateway, each command message containing the connection parameter or parameters associated with the dynamic virtual connection.

7. The method according to claim 1, in which the communication network is in conformity with version 8 and with the subsequent versions of the LTE standard, as defined by the standardization body 3rd Generation Partnership Project (3 GPP).

8. The method according to claim 1, in which the connection parameter or parameters are selected from the group of; an identifier of a connection class, a priority level, a guaranteed throughput and a maximum throughput; there being assigned to each connection class, a priority, a maximum latency and a maximum packet loss rate.

9. A non-transitory computer readable medium comprising computer-executable software instructions, which when they are executed by a computer, cause the computer to perform a method of managing at least one dynamic virtual connection between a mobile terminal and a communication network, the communication network being in conformity with the Long Term Evolution (LTE) standard and including a plurality of quality of service managers, multiple network gateways and multiple base stations, each network gateway being connected, on the one hand, to a quality of service manager, and on the other hand, to one or more base stations,
the mobile terminal being configured to be connected to a preceding base station and being configured to be connected to a preceding gateway via the preceding base station, the preceding gateway being dependent upon the location of the mobile terminal,
one or more dynamic virtual connections in accordance with the LTE standard being arranged between the mobile terminal and the preceding gateway, via the preceding base station, each having at least one connection parameter,
the communication network further comprising a plurality of servers, being connected to a corresponding quality of service manager and being connected to a corresponding gateway via the quality of service manager, the method including
   detecting the connection of the mobile terminal to another base station the other base station being connected to a subsequent gateway to which the mobile terminal was not previously connected, the detecting being carried out by the subsequent gateway,
wherein the method further includes:
   creating via a subsequent quality of service manager connected to the subsequent gateway, one or more dynamic virtual connections according to the LTE standard between the mobile terminal and the subsequent gateway the number of dynamic virtual connections created between the mobile terminal and the subsequent gateway being equal to the number of preceding dynamic virtual connections arranged between the mobile terminal and the preceding gateway, and the connection parameter or parameters of the dynamic virtual connection or connections between the mobile terminal and the subsequent gateway being identical to the connection parameter or parameters of the preceding dynamic virtual connection or connections between the mobile terminal and the preceding gateway,
   wherein, during the creating the dynamic virtual connection or connections between the mobile terminal and the subsequent gateway, the connection parameter or parameters of the preceding dynamic virtual connection or connections are transmitted to a subsequent server connected to the subsequent gateway from a preceding server connected to the preceding gateway, and
   wherein the subsequent server sends to the preceding server a transmission request requesting transmission of connection parameters in order to receive the connection parameter or parameters of the preceding dynamic virtual connection or connections from the preceding server.

10. A non-transitory computer readable medium comprising computer: executable software instructions, which when they are executed by a computer, cause the computer to perform a method of managing at least one dynamic virtual connection between a mobile terminal and a communication network, the communication network, being in conformity with the Long Term Evolution (LTE) standard and including a plurality of quality of service managers, multiple network gateways and multiple base stations, each network gateway being connected, on the one hand, to a quality of service manager, and on the other hand, to one or more base stations,
   the mobile terminal being configured to be connected to a preceding base station and being configured to be connected to a preceding gateway via the preceding base station, the preceding gateway being dependent upon the location of the mobile terminal,
   one or more dynamic virtual connections in accordance with the LTE standard being arranged between the mobile terminal and the preceding gateway, via the preceding base station, each having at least one connection parameter,
   the communication network further including a switching member being configured to communicate with each corresponding quality of service manager and being configured to route a quality of service related request to a corresponding quality of service manager,
the method including:
   detecting the connection of the mobile terminal to another base station, the other base station being connected to a subsequent gateway to which the mobile terminal was not previously connected, the detecting being carried out by the subsequent gateway,
wherein the method further includes:
   creating via a subsequent quality of service connected to the subsequent gateway, one or more dynamic virtual connections according to the LTE standard between the mobile terminal and the subsequent gateway, the number of dynamic virtual connections created between the mobile terminal and the subsequent gateway being equal to the number of preceding dynamic virtual connections arranged between the mobile terminal and the preceeding gateway, and the connection parameter or parameters of the dynamic virtual connection or connections between the mobile terminal and the subsequent gateway being identical to the connection parameter or parameters of the preceding dynamic virtual connection or connections between the mobile terminal and the preceding gateway,
   wherein during the creating the dynamic virtual connection or connections between the mobile terminal and the subsequent gateway, the connection parameter or parameters of the dynamic virtual connections are transmitted to the subsequent quality of service manager by the switching member.

11. A communication network for communicating with at least one mobile terminal, the network being in conformity with the Long Term Evolution (LTE) standard and comprising a plurality of quality of service managers, multiple network gateways and a plurality of base stations, each network gateway being connected, on the one hand, to a quality of service manager, and on the other hand, to one or more base stations,
   the mobile terminal being configured to be connected to a preceding base station and being configured to be connected to a preceding gateway via the preceding base station, the preceding gateway being dependent upon the location of the mobile terminal,
   one or more dynamic virtual connections in accordance with the LTE standard being configured to be arranged between the mobile terminal and the preceding gateway, via the preceding base station, each having at least one connection parameter,
   the network further including a detection means for detecting the connection of the mobile terminal to another base station, the other base station being connected to a subsequent gateway to which the mobile terminal was not previously connected, the detection means being included in the subsequent gateway,
   wherein the network further includes a creation means for creating, via a subsequent quality of service manager connected to the subsequent gateway, one or more dynamic virtual connections according to the LTE standard between the mobile terminal and the subsequent gateway, the number of dynamic virtual connections created between the mobile terminal and the subsequent gateway being equal to the number of preceding dynamic virtual connections arranged between the mobile terminal and the preceding gateway, and the connection parameter or parameters of the dynamic virtual connection or connections between the mobile terminal and the subsequent, gateway being identical to the connection parameter or parameters of the preceding dynamic virtual connection or connections between the mobile terminal and the preceding gateway.

12. The communication network according to claim 11, in which the communication network further comprises a plurality of servers, each being connected to a corresponding quality of service manager and being connected to a corresponding gateway via the quality of service manager, and in which a preceding server connected to the preceding gateway includes a transmission means for transmitting, during the creation of the dynamic virtual connection or connections between the mobile terminal and the subsequent gateway, the connection parameter or parameters of the preceding dynamic virtual connection or connections to a subsequent server connected to the subsequent gateway.

13. The communication network according to claim 12, in which the subsequent server comprises a message dispatch means for sending, to the subsequent quality of service manager, for each dynamic virtual connection to be created, a command message ordering the creation of the corresponding dynamic virtual connection between the mobile terminal and the subsequent gateway, each command message containing the connection settings and parameter or parameters associated with the dynamic virtual connection.

14. The communication network according to claim 12, in which the subsequent server comprises a request means for requesting the transmission of the connection parameter or parameters of the preceding dynamic virtual connection or connections from the preceding server.

15. The communication network according to claim 11, in which the communication network further includes a switching member being configured to communicate with each corresponding quality of service manager and being configured to route a quality of service related request to a corresponding quality of service manager, and in which the switching member includes transmission means for transmitting, during the creation of the dynamic virtual connection or connections between the mobile terminal and the subsequent gateway, the connection parameter or parameters of the preceding dynamic virtual connection or connections to the subsequent quality of service manager.

16. The communication network according to claim 14, in which the switching member comprises a message dispatch means for sending, to the subsequent quality of service manager, for each dynamic virtual connection to be created, a command message ordering the creation of the corresponding dynamic virtual connection between the mobile terminal and the subsequent gateway, each command message containing the connection parameter or parameters associated with the dynamic virtual connection.

* * * * *